Nov. 22, 1966 B. L. MOORE 3,286,448
AUTOMATIC HEADER CONTROL APPARATUS
Filed Jan. 21, 1964
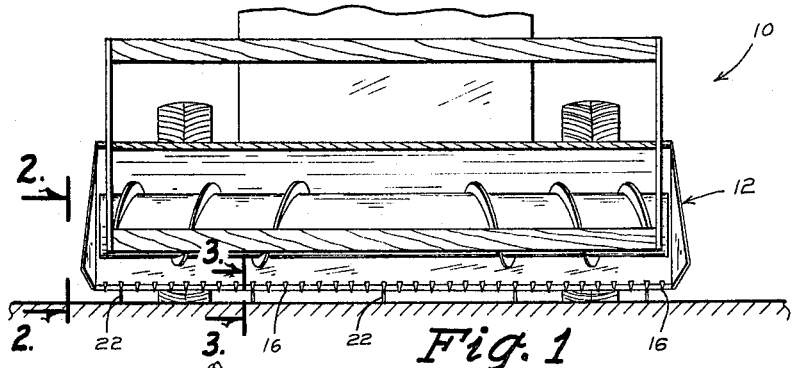
Fig. 1
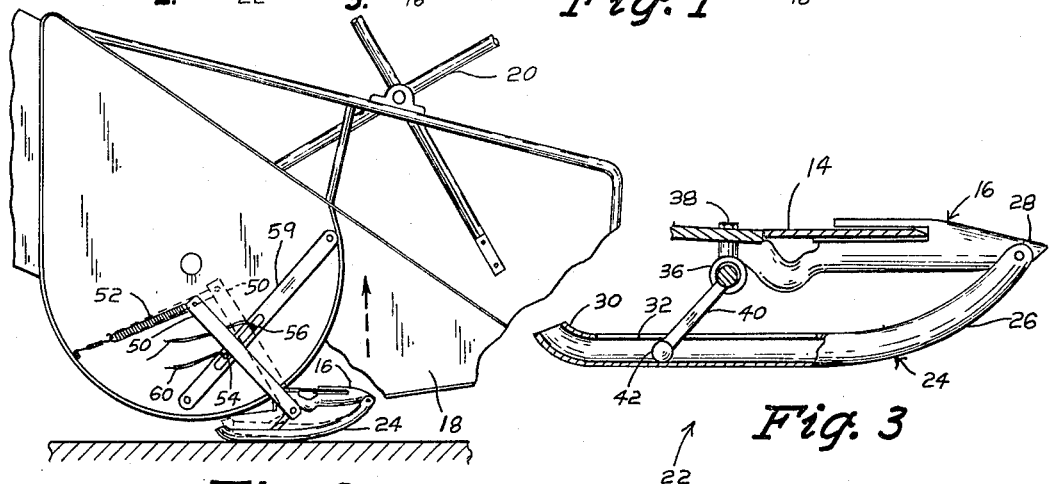
Fig. 2
Fig. 3
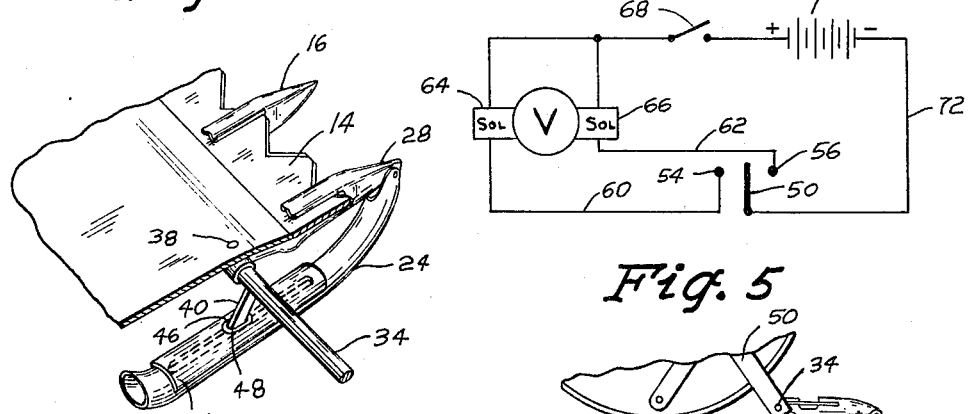
Fig. 4
Fig. 5
Fig. 6
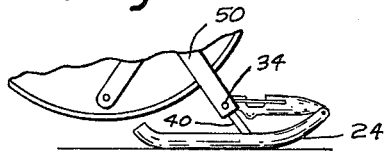
INVENTOR
BEVERLY L. MOORE
BY
Dick & Zarley
ATTORNEYS United States Patent Office 3,286,448
Patented Nov. 22, 1966

3,286,448
AUTOMATIC HEADER CONTROL APPARATUS
Beverly L. Moore, Seymour, Iowa, assignor, by mesne assignments, to Roper-Wright Manufacturing Co., Inc., Goshen, Ind., a corporation of Indiana
Filed Jan. 21, 1964, Ser. No. 339,185
5 Claims. (Cl. 56—208)

This invention relates to combines and in particular to an automatic header control apparatus.

Several systems have been developed for controlling the height of a combine header; however, they have each had the shortcoming of occupying considerable space under the combine header and thereby making it impossible to cut the crop close to the ground. It is particularly important that soybeans, for example, be cut very close to the ground and, therefore, a header control apparatus which maintains the cutting level of the combine at a considerable height above the ground would be unsatisfactory for use on combines harvesting soybeans or the like.

It is therefore one of the objects of this invention to provide an apparatus for a combine for automatically sensing and adjusting the header height above the ground.

It is a further object of this invention to provide a combine having a header height sensing and adjusting apparatus which permits the cutting means of the combine to operate at a minimum clearance above the ground.

It is still a further object of this invention to provide a combine having an automatic header adjusting apparatus which makes a combine particularly well suited for cutting standing soybeans.

It is a still further object of this invention to provide a combine having an automatic header height adjusting apparatus including a rocker member which may pivot on either side of a vertical plane extending along a longitudinal axis of a rocker shaft.

A still further object of this invention is to provide a combine having an automatic header adjusting apparatus which includes feeler members so positioned relative to the cutter guard members that clogging of the cutting means and cutter guards is eliminated.

It is a still further object of this invention to provide a combine having an automatic header height adjusting apparatus which includes means for preventing clogging of the feeler members.

A still further object of this invention is to provide a combine with an automatic header height adjusting apparatus which includes electrically controllable means for operating a hydraulic power system which raises and lowers the combine header.

A further object of this invention is to provide an automatic header control apparatus which is simple in design, economical to manufacture and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a front elevational view of a combine employing the automatic header height adjusting apparatus of this invention and showing in particular the feeler members mounted in spaced relationship along the width of the forward edge of the combine header;

FIG. 2 is a side elevation view taken along line 2—2 in FIG. 1;

FIG. 3 is a fragmentary side elevation view taken along line 3—3 in FIG. 1 and showing in particular the construction of the feeler member assembly and its relationship to the combine header structure;

FIG. 4 is a fragmentary perspective view of the feeler member structure showing in particular the top side thereof and the optional cover means carried by the feeler member;

FIG. 5 is an electrical schematic showing the wiring of the electrical control system coupling the feeler member assembly to the conventional hydraulic power means for raising and lowering the header of the combine; and FIG. 6 is a fragmentary side elevation view of the feeler member assembly of FIG. 3 but showing the rocker member pivoted to a forward position as an alternative to the rearward position as shown in FIG. 3.

In FIG. 1 of the drawings a combine 10 is shown having a header 12 on the forward end thereof. A conventional cutting sickle 14 is shown in FIG. 3 extending the full width of the header 12 (FIG. 1) and protected by a plurality of spaced apart cutter guards 16. As shown in FIG. 2, side panels 18 project forwardly of the cutter guards 16. Between the side panels 18 and above the cutting sickle 16, a reel assembly 20 is provided.

The structure thus far described is conventional and not considered a part of this invention except as taken in combination with the following structure relating to the apparatus generally referred to by reference numeral 22 for controlling the height of the header 12 above the ground. The height control apparatus 22 includes a feeler member 24 having an upwardly curved forward portion 26 pivotally connected to the forward pointed end 28 of the guard 16 as shown in FIG. 3. The feeler member 24 is also provided with an upwardly turned rear end portion 30, thus preventing the feeler member 24 from digging into the ground when the combine 10 is moved rearwardly.

The feeler member 24 is generally circular in cross-section having a slot 32 formed in the top side. Extending the full width of the header 12 directly beneath its underside and secured thereto is a rocker shaft 34 carried by bearing mounts 36 suitably mounted to the header 12 by bolts 38 or the like. A rocker member 40 is fixedly secured to the rocker shaft 34 and is shown in FIG. 3 as having a ball portion 42 on its lower free end. The ball portion 42 is slidably received in the channel of the feeler member 24 as the rocker member 40 extends through the feeler member slot 32. Thus as the rocker member 40 pivots forwardly and rearwardly, the feeler member 24 pivots downwardly and upwardly respectively.

In FIG. 4, a dirt shield 44 is provided having a shape corresponding to the external shape of the feeler member 24 and being carried by the rocker member 40. Accordingly, the shield member 44 is provided with an opening 46 through which the rocker member 40 extends; and the cover 44 is adapted to slide in mating engagement along the length of the feeler member 24, as the rocker shaft 34 rotates. To assure maximum sealing of the internal space of the feeler member 24, a resilient seal element 48 (FIG. 4) is provided in the opening 46 in the shield 44 and tightly embraces the rocker member 40. In addition to keeping the inside of the feeler member 24 free from dirt and debris, the seal element 48 serves to minimize wear on the shield or cover member 44 in the area of the opening 46. At one side of the header 12 outwardly of the panel 18, as shown in FIG. 2, a finger member 50 is fixedly secured to the outer end of the rocker shaft 34 and extends rearwardly and upwardly therefrom. An adjustable spring 52 is secured to the outer free end of the finger member 50. The other end of the spring 52 is in turn secured to the panel 18 below the finger 50 to normally pull the finger 50 downwardly and thus pivot the feeler member 24 downwardly into into contact with the ground therebelow.

On opposite sides of the finger member 50, a pair of electrical terminals 54 and 56 are mounted on a support plate 59. These terminals are each provided with lead wires 60 and 62 respectively.

As shown in FIG. 5, the terminals 54 and 56 are connected to solenoid valves 64 and 66 which are in turn connected through a manually operated switch 68 to a battery power supply 70. The other side of the battery 70 is grounded by a lead wire 72 to the finger member 50.

The solenoid valves 64 and 66 are mounted in a conventional hydraulic power system (not shown) wherein, for example, when either of the valves 64 which are normally closed, are energized they are accordingly opened to permit the flow of hydraulic fluid through the hydraulic system to operate the hydraulic lift cylinder (not shown). Thus, in operation the manual switch 68 would be closed to put in operation the automatic header adjusting apparatus. The appropriate tension is placed on the spring 52 to stabilize the finger member 50. The combine header 12 is then lowered to the desired height above the ground with the feeler members 24 in engagement therewith placing the finger member 50 intermediate the terminals 54 and 56, as shown in FIG. 2. When one of the feeler members 24 hits an obstruction such as a clod of dirt or the like, it is raised to the dash line position in FIG. 2 and thereby moves the finger member 50 to its dash line position in contact with the electrical terminal 56. As seen in FIG. 5 with the finger member 50 in contact with the terminal 56 the electrical circuit through the solenoid 66 is closed thereby permitting hydraulic fluid to flow to the hydraulic lift cylinder and thereby raise the header combine 12 and consequently permitting the feeler member 24 to return to its normal solid line position below the header 12. Conversely, should the feeler members 24 along the width of the combine 12 pass over a low spot in the ground, they would be pivoted downwardly by the pull of the spring 52 on the finger 50 and, accordingly, bringing the finger member 50 into contact with the electrical terminal 54. As seen in FIG. 5, the electrical circuit through the solenoid valve 64 would be completed and thus hydraulic fluid would be reversed in its direction of travel and cause the hydraulic cylinder to lower the header 12 until the feeler members 24 again contacted the ground and moved the finger member 50 away from the terminal 54.

It is obvious from the above description that it is virtually impossible for the cutting sickle 14 and the guards 16 to become clogged with dirt or debris since such material would engage the feeler members 26 before or simultaneous with contacting the sickle and guard members, and, accordingly, the header 12 would be raised to move over the obstruction. If the feeler members were pivoted at a point rearwardly of the forward edge of the guards 16, then the guards and cutting sickle could temporarily be clogged until the mound of dirt or the like had come in contact with a feeler member 26. The time interval might very well be enough to require manual cleaning of the clogged assembly.

By use of the cover or shield 44 rocker arm 40 is free to pivot rearwardly and forwardly as the feeler members 24 pivot upwardly and downwardly.

As shown in FIG. 6, the feeler member 40 may be extended forwardly of a vertical plane through its pivotal connection to the rocker shaft 34.

Thus it is seen that continuous adjustment in the height of the header 12 is made to maintain the sickle 14 at the minimum distance above the ground without being clogged by dirt and debris whereby an effective job of cutting soybeans and the like may be accomplished.

Some changes may be made in the construction and arrangement of my Automatic Header Control Apparatus without departing from the real spirit and purpose of my invention, and it is my intention to cover by my claims, any modified forms of structure or use of mechanical equivalents which may be reasonably included within their scope.

I claim:

1. In a combine having a header and cutting means along the forward edge, a header height sensing and adjusting apparatus, comprising, a plurality of feeler members spaced along and under the forward edge of said cutting means, each of said members being pivotally connected at one end to the forward edge of said header, the other end of each of said feeler members extending rearwardly, means for normally urging said feeler members to pivot downwardly, each of said feeler members being channel-shaped with the open side of said channel facing upwardly, a rocker shaft extending along the width of said header rearwardly of said forward edge, a rocker member for each of said feeler members with one end slidably received in said channel and the other end fixedly connected to said rocker shaft, a power means for raising and lowering said header, and means operatively connected between said rocker shaft and said power means to adjust said header downwardly as one of said feeler members moves downwardly and to adjust said header upwardly as said feeler members move upwardly, said feeler members normally being held in contact with the ground by said means for urging them downwardly.

2. In a combine having a header and cutting means along the forward edge, a header height sensing and adjusting apparatus, comprising, a plurality of feeler members spaced along and under the forward edge of said cutting means, each of said members being pivotally connected at one end to the forward edge of said header, the other end of each of said feeler members extending rearwardly, means for normally urging said feeler members to pivot downwardly, each of said feeler members being channel shaped with the open side of said channel facing upwardly, a rocker shaft extending along the width of said header rearwardly of said forward edge, a rocker member for each of said feeler members with one end slidably received in said channel and the other end fixedly connected to said rocker shaft, means for restricting pivotal movement of said rocker members to one side of a vertical plane through the longitudinal axis of said rocker shaft, a power means for raising and lowering said header, and means operatively connected between said rocker shaft and said power means to adjust said header downwardly as one of said feeler members moves downwardly and to adjust said header upwardly as said feeler members move upwardly, said feeler members normally being held in contact with the ground by said means for urging them downwardly.

3. In a combine having a header and cutting means along the forward edge, a header height sensing and adjusting apparatus, comprising, a plurality of feeler members spaced along and under the forward edge of said cutting means, each of said members being pivotally connected at one end to the forward edge of said header, the other end of each of said feeler members extending rearwardly, means for normally urging said feeler members to pivot downwardly, each of said feeler members being channel shaped with the open side of said channel facing upwardly, a rocker shaft extending along the width of said header rearwardly of said forward edge, a rocker member for each of said feeler members with one end slidably received in said channel and the other end fixedly connected to said rocker shaft, a cover member carried by said rocker member and matingly and slidably engaging the top side of said feeler member to cover the open side of said channel, said cover member having a length sufficient to cover said open channel side at all times during the pivotal movement of said rocker member, a power means for raising and lowering said header, and means operatively connected between said rocker shaft and said power means to adjust said header downwardly as one of said feeler members moves downwardly and to adjust said header upwardly as said feeler members move upwardly, said feeler members normally being held in contact with the ground by said means for urging them downwardly.

4. The structure of claim 3 wherein said feeler members have front and rear end portions turned upwardly.

5. The structure of claim 3 wherein said cover member has an opening therethrough to receive said rocker arm and a sealing element is disposed in said opening around said rocker member.

References Cited by the Examiner

UNITED STATES PATENTS 2,750,727   6/1956   Wright _____ 56—208

ABRAHAM G. STONE, *Primary Examiner.*

ANTONIO F. GUIDA, *Examiner.*